United States Patent [19]
Hatton et al.

[11] Patent Number: 5,186,332
[45] Date of Patent: Feb. 16, 1993

[54] PAPER STOCK SCREENING APPARATUS HAVING HEAVY REJECTS TRAP

[75] Inventors: Derald R. Hatton, Middletown; Joseph P. Constiner, Monroe; David E. Suica, Cincinnati, all of Ohio

[73] Assignee: The Black Clawson Company, Middletown, Ohio

[21] Appl. No.: 715,445

[22] Filed: Jun. 14, 1991

[51] Int. Cl.$^5$ .............................. B03B 7/00
[52] U.S. Cl. .................... 209/17; 209/211; 209/250; 209/273; 210/414; 210/415; 210/512.3
[58] Field of Search ................ 209/17, 211, 250, 273; 210/413, 414, 415, 512.1, 512.3; 162/55

[56] References Cited

U.S. PATENT DOCUMENTS

| | | | |
|---|---|---|---|
| 2,347,716 | 5/1944 | Staege | 209/273 |
| 2,835,173 | 5/1958 | Martindale | 209/270 X |
| 3,849,302 | 11/1974 | Seifert | 209/273 |
| 4,105,543 | 8/1978 | Seifert | 209/273 X |
| 4,165,283 | 8/1979 | Weber et al. | 210/111 |
| 4,166,028 | 8/1979 | Weber | 209/273 |
| 4,702,837 | 10/1987 | Lecoffre et al. | 210/512.3 |
| 4,851,111 | 7/1989 | Martin et al. | 209/304 |
| 4,919,796 | 4/1990 | Vikiö | 209/211 |
| 4,941,970 | 7/1990 | Ahs | 209/270 X |
| 5,009,774 | 4/1991 | LeBlanc | 209/273 |

FOREIGN PATENT DOCUMENTS

| | | | |
|---|---|---|---|
| 0186021 | 7/1986 | European Pat. Off. | 209/211 |
| 8202344 | 7/1982 | World Int. Prop. O. | 210/512.1 |

Primary Examiner—Andres Kashnikow
Assistant Examiner—Joseph A. Kaufman
Attorney, Agent, or Firm—Biebel & French

[57] ABSTRACT

Screening apparatus for paper making stock comprises a generally cylindrical vertical housing having the interior thereof separated by a cylindrical perforated screening member into a screening chamber and an annular accepts chamber on the inner and outer sides of the screening cylinder respectively. The feed stock enters an inlet chamber below the screening chamber tangentially, and special provision is made for preventing heavy reject particles from circulating around the bottom of the inlet chamber. For this purpose, the inlet chamber is provided at a position spaced circumferentially downstream from the inlet port, with an outlet port into which high specific gravity particles are carried by centrifugal force along with the carrying liquid. A conduit leads from this outlet port back to the inlet chamber in order to maintain a continuous flow through this conduit. At an intermediate position along this conduit, provision is made for trapping heavy particles entrained with the stock passing through the conduit, and these trapped particles are purged from time to time.

12 Claims, 2 Drawing Sheets

U.S. Patent     Feb. 16, 1993     Sheet 1 of 2     5,186,332
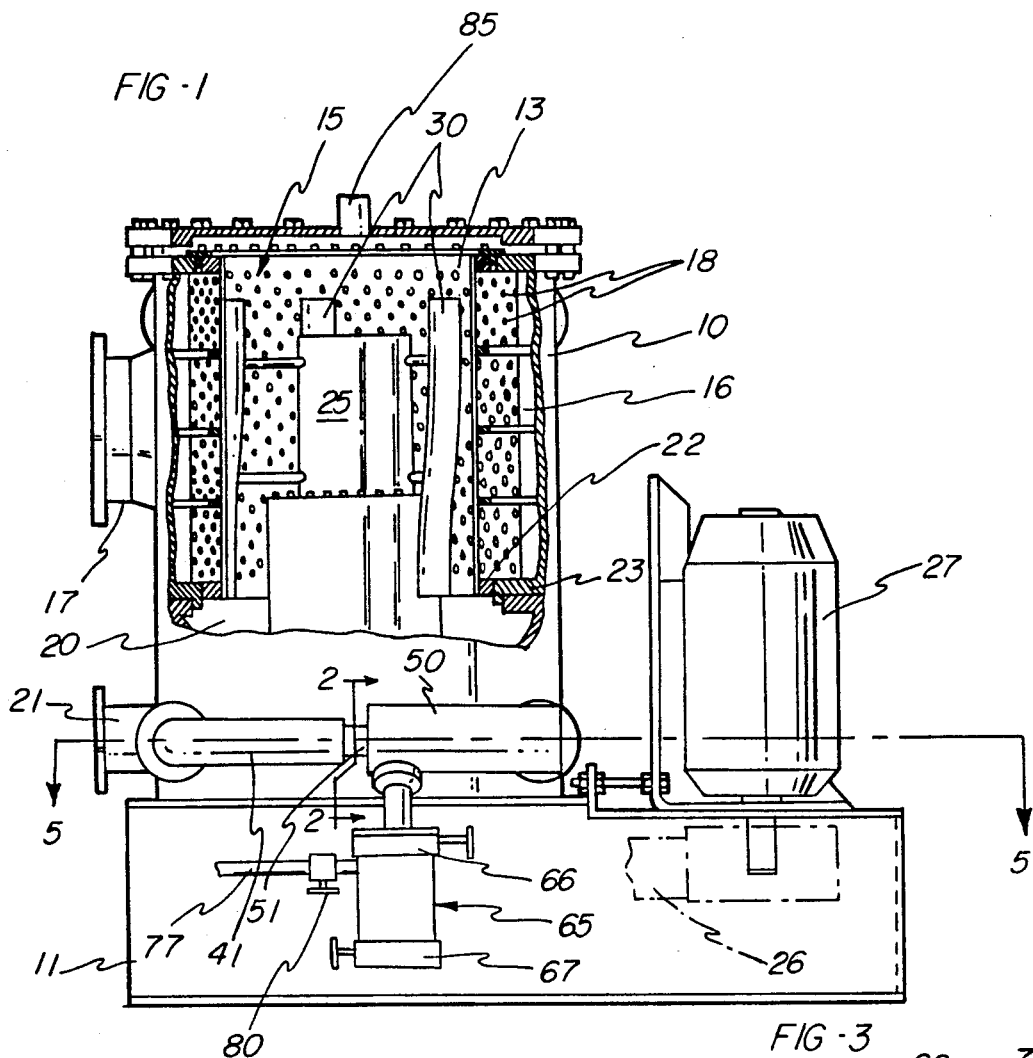
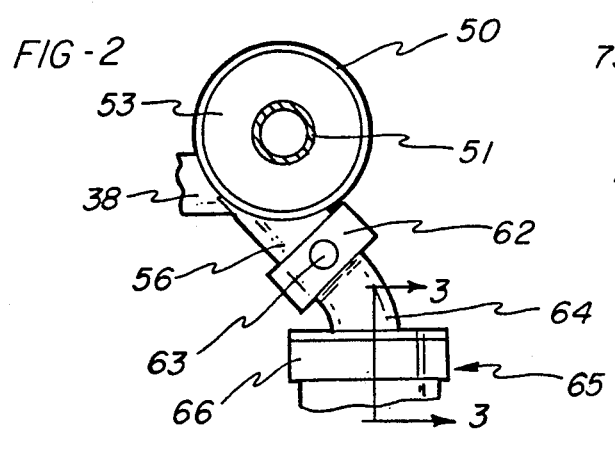
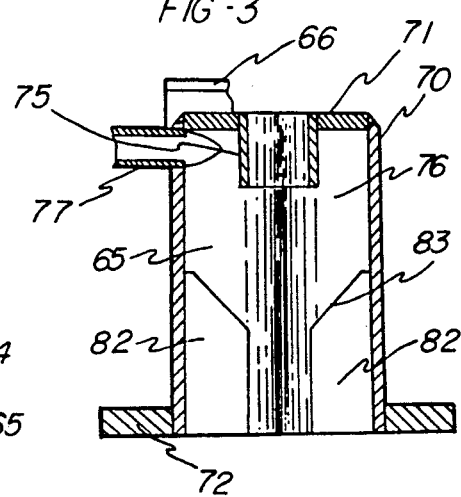

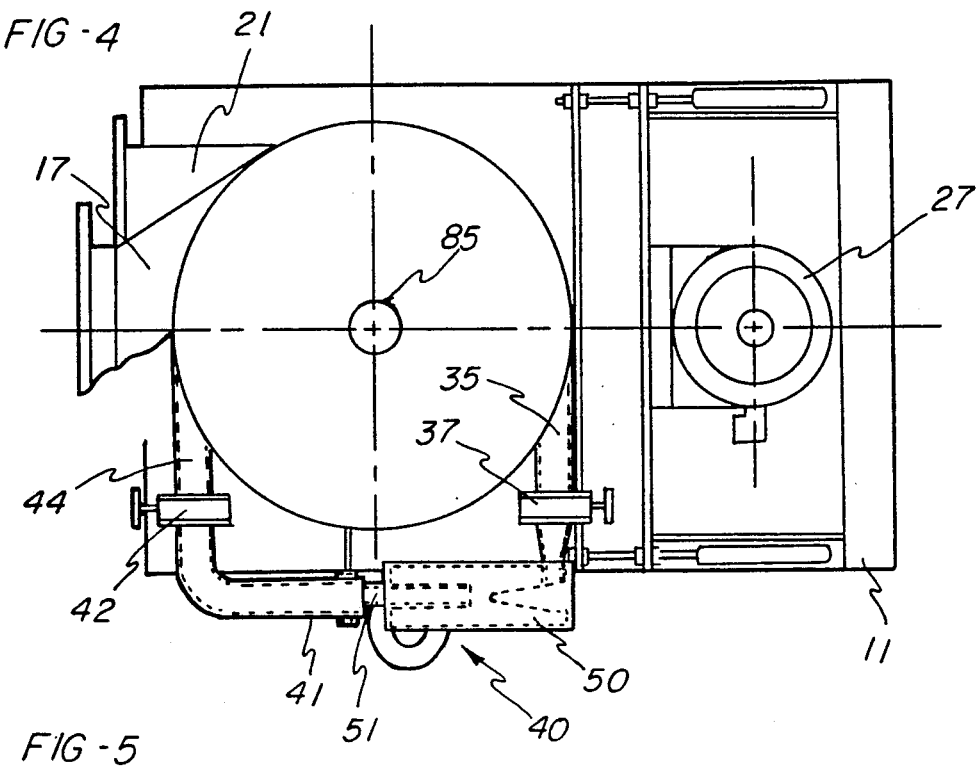
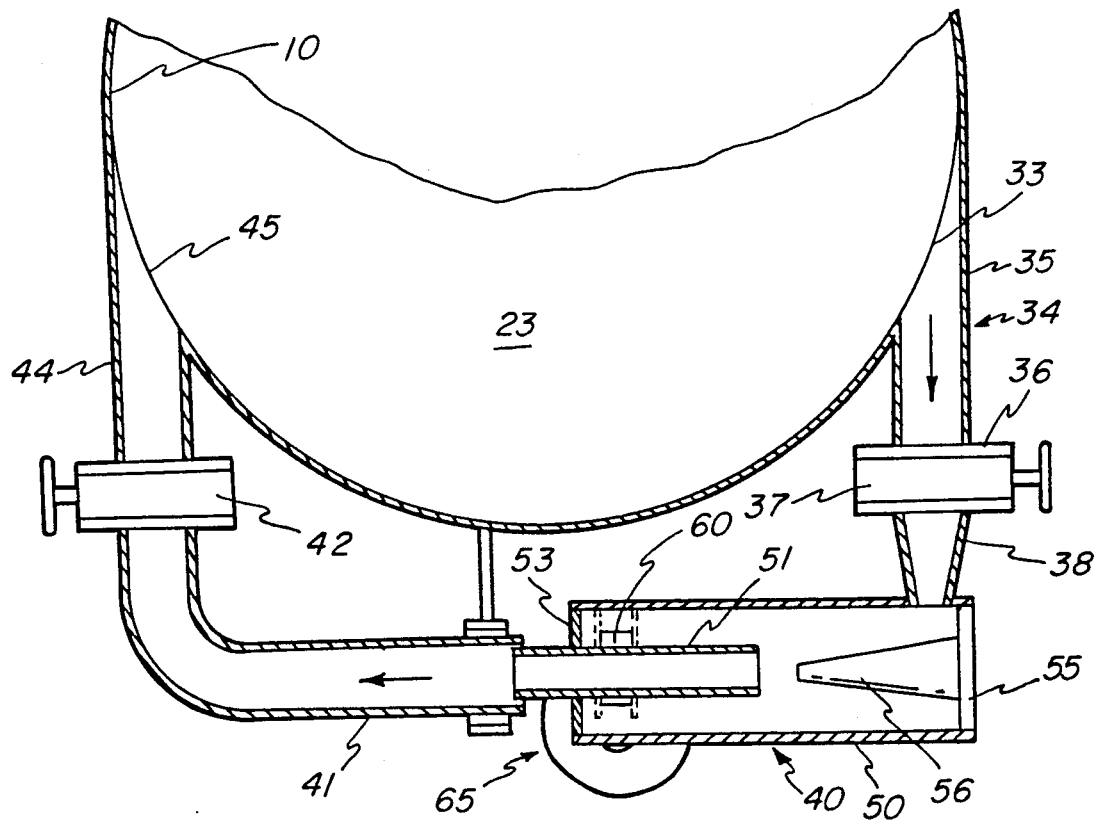

PAPER STOCK SCREENING APPARATUS HAVING HEAVY REJECTS TRAP

BACKGROUND OF THE INVENTION

Paper mills have for many years made extensive use, for the cleaning of paper making stock, of pressure screening apparatus embodying a perforated screening cylinder which defines screening and accepts chambers on the opposite sides thereof in a vertical housing, and wherein a rotor member operates in one of the chambers to keep the screening perforations open and free from solid material having a tendency to cling to the surface of the screening cylinder.

The assignee of this invention has manufactured and sold many such pressure screens in accordance with a series of U.S. patents, commencing with Staege U.S. Pat. No. 2,347,716, and followed by Martindale U.S. Pat. No. 2,835,173 and numerous other patents including Seifert U.S. Pat. Nos. 3,849,302 and 4,105,543. In operation, the stock or furnish is delivered to the screening chamber adjacent one end of the screening cylinder, and the material rejected by the screening cylinder is collated and discharged from the opposite end of the screening chamber.

In all of the vertically oriented commercial screens in accordance with any of the above patents, the primary direction of through flow is downward, with the stock entering the screen chamber from above, or in some cases centrally of the screening chamber when the direction of screening is from the outside to the inside of the screen member, so that any high specific gravity reject particles entrained with the stock to be screened will travel to a reject discharge chamber in the lower part of the screen, from which it is subsequently discharged. Necessarily, therefore, there is opportunity for such reject particles to damage the perforate screening cylinder as it travels through the screening chamber, especially with screens of the type wherein the screening chamber is on the inside of the screening cylinder, and wherein centrifugal force therefore will cause high specific gravity particles to travel along the screening surface.

In order to cope with this problem, it has been proposed to provide screening apparatus of the general type outlined above with a stock inlet chamber below the screening chamber, and to collect heavy reject particles from that inlet chamber so that it does not reach the screening chamber. Co-owned U.S. patents to Weber U.S. Pat. No. 4,166,028 and Martin et al U.S. Pat. No. 4,851,111 show such screening apparatus wherein the inlet chamber is below the screening chamber, and wherein a tangentially directed outer port for heavy reject particles lead from the bottom of the inlet chamber to a collection chamber which is periodically or intermittently opened to purge collected heavy reject particles therefrom.

This provision for removing heavy reject particles has not proved to be as successful as had been hoped, especially when the feed stock contains substantial quantities of particles in the form of pebbles and tramp metal as is often the case in pulp mills. The problem has been that substantial quantities of the heavy reject particles entering the inlet chamber are swept past the reject port therefor and continue to circulate around the lower portion of the outer wall of the inlet chamber. Further, since the rate at which this circulation occurs may be relatively high, the circulating heavy particles tend to abrade the wall of the inlet chamber.

SUMMARY OF THE INVENTION

The present invention is directed to solving this problem, and the solution which it provides derives from the premise that while the reject outlet could be expected to trap heavy reject particles circulating at relatively slow rates around the periphery of the inlet chamber, the reject outlet port is in essence a dead end when it is not open for purging. As a result, heavy reject particles entrained in stock circulating rapidly around the inlet chamber tend to be carried thereby past the reject outlet port before they have time to enter it. The solution of this problem proposed by the invention is to provide for a through flow of liquid through the reject outlet port and back to the inlet chamber after passing through a chamber wherein heavy reject particles are trapped and prevented from returning to the inlet chamber.

More specifically, in screening apparatus according to the invention, the inlet chamber below the screening chamber is provided with a tangential inlet port through which the feed stock enters adjacent the bottom of the inlet chamber, and an outlet port is provided in the wall of the chamber at a position spaced circumferentially downstream from the inlet port into which high specific gravity particles are carried by centrifugal force along with the carrying liquid. A conduit leads from this outlet port back to the inlet chamber at a position downstream from the outlet port in the direction of circulation within the inlet chamber in order to maintain a continuous flow through this conduit. At an intermediate position along this conduit, provision is made for separating and trapping heavy particles entrained with the stock passing through the conduit, and these trapped particles are purged periodically or intermittently as the case may be.

Other objects and advantages of the invention, and specific provisions by which they are achieved, will be apparent from or pointed out in the course of the detailed description of the preferred embodiment which follows.

DESCRIPTION OF THE DRAWINGS

FIG. 1 is a side elevation of screening apparatus incorporating a preferred embodiment of the present invention;

FIG. 2 is an enlarged fragmentary section on the line 2—2 in FIG. 1;

FIG. 3 is a fragmentary section on the line 3—3 in FIG. 2 on a somewhat larger scale;

FIG. 4 is a plan view of the screening apparatus shown in FIG. 1; and

FIG. 5 is an enlarged fragmentary view partly in section on the line 5—5 in FIG. 1.

DESCRIPTION OF THE PREFERRED EMBODIMENT

The screening apparatus shown in the drawings comprises a main housing 10 of cylindrical section mounted with its axis vertical on a base 11. A perforate screening cylinder 13 divides the central portion of the interior of the housing 10 into a screening chamber 15 and an annular accepts chamber 16 having a radially arranged outlet port 17 for accepted stock which has passed through the perforations 18 in the cylinder 13. These perforations may be of any conventional shape, size and spacing such, for example, as disclosed in the above Seifert patents.

Below the screening chamber 15 is the inlet chamber 20, to which stock to be screened is delivered by an inlet port 21 that is tangentially arranged to cause the feed stock to circulate in the inlet chamber before rising to the screening chamber, in clockwise direction as viewed in FIG. 4. The lower end of the screening cylinder 13 includes an annular flange 22 which cooperates with the bottom wall 23 of the accepts chamber 15 to define an annular space adjacent the portion of the housing 10 surrounding the inlet chamber 20, the inner diameter of this space being equal to the inner diameter of the screening cylinder 13.

Within the screening chamber 15 is a rotor assembly 25 secured on the upper end of a drive shaft which is supported on the base 11 and driven through a belt drive 26 by a motor 27 also mounted on the base 11. The rotor assembly 25 includes four angularly spaced vanes 30 which are supported in closely spaced relation with the inner surface of the screening cylinder 13 and operate to create alternate positive and negative pressure pulses effective on the perforations in the screening cylinder to keep those perforations from becoming covered or clogged by solid materials.

The tangential entry of the feed stock through the inlet port 21 creates centrifugal force effective to carry high specific gravity particles, e.g. tramp metal, pebbles etc., into the annular space around the outside of inlet chamber 20 which lies below the flange 22 and wall 23, and this centrifugal force is intensified by the rotor vanes 30, which travel in the same direction as the incoming stock to increase its velocity. The primary objective of the invention is to assure effective removal of the heavy reject particles as soon as possible after they enter the inlet chamber 20.

For this purpose, a reject outlet port 33 is provided through the housing 10 close to the bottom wall 23 of the inlet chamber, and a conduit identified generally as 34 which leads from this port 33 back to the inlet chamber 20 includes means for trapping heavy reject particles. More specifically, as shown in FIG. 5, the outlet port 33 is in the form of a rectangular slot which connects directly with a complementarily shaped open side and end of pipe means comprising an adapter 35 of square section at its end which is welded to the side of housing 10 in enclosing relation with the slot 33. The adapter 35 changes to round section at its other end, which includes a flange 36 connected to one side of a valve 37. A similar adapter 38 leads from the other side of valve 37 to the inlet end of a trap assembly 40 described in detail hereinafter.

A cylindrical pipe 41 leads from the downstream end of trap assembly 40 to one side of a flow control valve 42, and a pipe 44 leads from valve 42 back to the inlet chamber 20 at a position spaced downstream, in the direction of circulation, from the port 33. As shown in FIG. 5, the downstream end of the pipe 44 connects with the inlet chamber 20 tangentially through a return port 45 in the wall of housing 10.

The trap assembly 40 comprises horizontal lengths of cylindrical pipe 50 and 51 concentric with each other and with the pipe 41. The pipe 50 is of substantially larger cross-sectional flow area than the pipe 51; for example, the pipe 50 may have an inner diameter of approximately 6 inches as compared with an inner diameter of 2 inches for pipe 51.

As shown in FIG. 5, the pipe 51 extends for a substantial distance inside the pipe 50, but it also extends downstream beyond the pipe 50, and its outer end is connected to the pipe 41. At its downstream end, the pipe 50 is closed by an annular wall 53 which is also sealed to the outer surface of the pipe 51.

At its upstream end, the pipe 50 is closed by a plate or cap 55 which may also include a vortex stabilizer 56. Adjacent its downstream end, the pipe 50 is provided along its underside with a rectangular outlet port 60 connected by an adapter 61 with one end of visual inspection device 62 having windows 63 on opposite sides thereof. An elbow 64 leads from the opposite end of device 62 to a reject chamber 65 having a slide valve 66, 67 at each end.

The reject chamber 65 is of special internal construction to prevent it and the trap assembly 40 from becoming clogged with fiber. Referring particularly to FIG. 3, the chamber 65 comprises a cylindrical wall 70 having a top wall 71 by which it is connected to the valve 66, and a flange 72 at its lower end by which it is connected to the valve 67.

The top wall 71 has a central opening in which is secured a short tube 75 open at both ends thereof which defines with wall 70 an annular space 76 at the upper end of reject chamber 65. An inlet line 77 for elutriation liquid is connected tangentially with the interior of chamber 65 just below the top wall 71 so that it delivers liquid tangentially into the annular space 76 between cylinder 70 and tube 75.

In normal operation, the valve 66 is open while the valve 67 is closed, and the line 77 delivers a constant stream of liquid into the annular space 76 in reject chamber 65 which creates a vortex-like action in combination with the vortex finder action of tube 75. The result is a swirling action inside the chamber 65 which tends to separate any fiber that may be attached to or entrained with reject material and to carry that fiber back into the interior of pipe 50 for ultimate return through pipes 51 and 41 to the inlet chamber 20 for screening. The viewing windows 63 in the inspection device 62 enable the operator to observe the flow through the device 62 in order to determine the proper adjustment of the liquid supply through the inlet pipe 77, as by a manually adjusted valve 80.

While it is desirable, as just explained, to maintain an agitated condition in the upper part of the reject chamber 65, it is also desirable to prevent agitation in the bottom part of this chamber, in order to minimize abrasion by circulating heavy reject particles. For this purpose, the interior of the chamber 65 is provided with a plurality of radially arranged fins 82 which extend partway into the interior of the chamber 75 from the inner surface of the cylinder 70 and have beveled upper edges 83. Thus as reject particles fall below the upper edges of these fins, they become trapped between adjacent fins and accumulate without swirling until they are discharged by opening of the valve 67.

In operation, as the feed stock enters the inlet chamber 20 tangentially through the inlet port 21, centrifugal force will cause any high specific gravity reject particles entrained therewith to move outward to the portion of housing 10 which forms the outer wall of chamber 20 until they reach and enter the outlet port 33. This will happen because the stock which enters port 33 will return to the inlet chamber by way of the pipe 41, so that there will be continuous circulation through the trap assembly 40.

In the preferred form of the invention, not only is the pipe 50 of substantially larger section than the adapter 38, but this difference should be sufficient to enable the adapter 38 to connect with the pipe 50 tangentially, as shown in FIG. 2. As a result, heavy particles entrained with the stock entering the pipe 50 will be caused to circulate around the inner surface of this pipe, and thus away from the inlet end of the pipe 51.

More specifically, when heavy reject particles reach the pipe 50, centrifugal force will cause them to travel to and along the outside of this pipe until they pass the upstream end of the pipe 51, and this action is also promoted by the provision of the vortex stabilizer 56. The heavy reject particles will ultimately reach and fall through the port 60, the adapter 61 and the normally open valve 66 into the chamber 65 where all such reject particles collect until they are purged therefrom by temporary opening of the valve 67.

Whenever valve 67 is to be opened, it is preferable to close the valve 66 temporarily, to reduce the amount of liquid drained through the valve 67. This can readily be effected automatically by interconnected conventional mechanical or electrical means for opening and closing both valves, e.g. by means of solenoid valves. The valves 37 and 42 can be closed if it is desired to disconnect the entire heavy reject disposal system from the screening area for cleaning or other servicing. Normally, however, they will remain open during emptying of the chamber 65 so that heavy reject particles will continue to be trapped in the pipe 50 and adapter 62.

It will of course be understood that the bypass and trap assembly of the invention is effective only for removing high specific gravity particles from the screening apparatus. Low specific gravity particles, such as pieces of plastic film and foam, will rise to the top of the screening chamber 15 and be intermittently or continuously purged therefrom by a top outlet connection 85, as disclosed in the above Wever patent.

It should now be apparent that the invention provides the important advantage during operation of its screening apparatus that heavy reject particles are intercepted surely and quickly after entering the inlet chamber, usually before they have travelled more than about 90° around the inner surface of the housing wall which encloses the inlet chamber. Thus in screening apparatus built as shown in the above Weber patent, wherein the reject port leads only to a closed valve, experience has shown that with that arrangement, there is a continuing tendency for heavy reject particles to be carried past their intended outlet port enough times to cause considerable scoring damage to the inner surface of the housing wall.

In contrast, apparatus in accordance with the present invention assures that there will be a constant flow of stock through the bypass conduit which includes the heavy reject trap, and this minimizes the possibility that heavy reject particles will bypass that conduit. In addition, the efficiency of reject removal can be increased by adjusting the flow control valve 42 to throttle the flow therethrough and thereby to reduce the flow velocity of the stock through the pipe 50 so that its carrying capacity for heavy reject particles is reduced and such particles respond more readily to gravitational forces causing them to remain in pipe 50 until they drop through outlet slot 60.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Screening apparatus for paper fiber stock comprising:
    (a) a housing including a generally cylindrical vertical wall,
    (b) means defining an inlet chamber in a lower end portion of said housing wall and including a bottom wall,
    (c) means defining a tangentially arranged stock inlet port for delivering stock to said inlet chamber adjacent said bottom wall with a circulatory movement in said chamber,
    (d) a cylindrical perforate screening member supported in said housing above said inlet chamber and cooperating with said housing to define a screening chamber within said screening member and an annular accepts chamber between the outer side of said screening member and said housing,
    (e) rotor means mounted for rotation in said screening chamber and including a hub having vane means mounted thereon in angular spaced relation,
    (f) means for driving said rotor means in the same direction as said circulatory movement of said stock in said inlet chamber,
    (g) means defining an outlet port from said inlet chamber through said lower end portion of said housing wall and adjacent said bottom wall of said inlet chamber for intercepting stock carrying heavy reject particles,
    (h) means forming a conduit leading from said outlet port to a return port into said inlet chamber at a position spaced angularly from said outlet port in the direction of said circulatory movement in said inlet chamber to recirculate to said inlet chamber stock entering said outlet port, and
    (i) means forming a part of said conduit-forming means for trapping high specific gravity reject particles carried into said conduit by stock recirculating therethrough and thereby removing said particles from said recirculating stock,
    said trapping means being constructed and arranged to provide for continuous flow of said recirculating stock therethrough with the fibrous constituents thereof back to said inlet chamber.

2. Screening apparatus as defined in claim 1 further comprising means for purging said trapping means of reject particles trapped thereby while maintaining said conduit open for continuous flow of stock therethrough.

3. Screening apparatus as defined in claim 1 wherein said conduit-forming means comprises pipe means leading outwardly from said reject outlet port, a generally horizontal first pipe connected to receive stock from said pipe means and of substantially larger flow area than said pipe means, a second pipe of substantially smaller diameter than said first pipe connected at one end in concentric relation with said first pipe and connected at the other end thereof to said return port into said inlet chamber, means defining an outlet in a bottom portion of said first pipe adjacent the downstream end thereof, and reject retaining means connected to receive high specific gravity reject particles from said outlet.

4. Screening apparatus as defined in claim 3 wherein said pipe means is so connected with said first pipe as to deliver stock tangentially into said first pipe.

5. Screening apparatus as defined in claim 1 wherein said conduit-forming means comprises a generally horizontal length of pipe mounted adjacent the outside of said inlet chamber, an adapter connected between said outlet port and said pipe, said adapter being arranged to deliver stock from said outlet port tangentially into one end of said pipe, a second pipe extending through the end of said first pipe remote from said adapter with an end thereof located at a position spaced between the opposite ends of said first pipe, means connecting the other end of said second pipe to said inlet chamber, and means defining an outlet in a bottom portion of said first pipe adjacent the end of said first pipe remote from said adapter.

6. Screening apparatus as defined in claim 1 further comprising valve means in said conduit between said trapping means and said return port for regulating the flow velocity of stock through said conduit.

7. Screening apparatus as defined in claim 3 further comprising valve means in said conduit between said second pipe and said return port for regulating the flow velocity of stock through said first pipe.

8. Screening apparatus as defined in claim 3 wherein said reject retaining means comprises a chamber located below said first pipe and having a cylindrical outer wall and upper and lower ends, means connecting said upper end of said chamber with said outlet from said first pipe to conduct reject particles from said first pipe into said chamber, said connecting means including a tube depending into the upper portion of said chamber from said upper end thereof and cooperating with said chamber outer wall to define an annular space within and adjacent the upper end of said chamber, and means for supplying liquid directly to said annular space through said cylindrical wall to carry fiber from said reject chamber back through said first pipe to said second pipe.

9. Screening apparatus as defined in claim 8 wherein said liquid supplying means comprises a supply pipe connecting tangentially of said cylindrical chamber wall with said annular space whereby said tube cooperates with said supply pipe to create a vortex action in said chamber.

10. In screening apparatus for paper fiber stock in which a housing is formed with an inlet chamber for receiving stock to be screened therein, in which said stock moves circumferentially within said chamber, in which a perforate screening cylinder is supported within said housing for receiving stock to be screened from said inlet chamber, and in which a rotor has vanes thereon which cooperate with said screening member and rotate in the direction of movement of stock in said inlet chamber, the improvement for separating and trapping high specific gravity reject particles from said stock before such reject particles reach said screening member which comprises:

a bypass conduit assembly positioned externally of said inlet chamber and including means defining a first conduit leading from said inlet chamber and extending generally tangentially therefrom in the direction of rotation of stock therein for accepting said reject particles along with a portion of the stock;

means defining a second conduit opening into said inlet chamber at a position spaced circumferentially downstream from said first conduit, and reject particle trap means positioned between and joining said first and second conduits for removing high specific gravity reject particles from said stock portion entering said first conduit from said inlet chamber while providing for continued return flow of said stock portion with the fibrous constituents thereof through said second conduit to said inlet chamber.

11. The improved screening apparatus according to claim 10 wherein said trap means comprises a generally horizontal first pipe of a given diameter connected to receive stock from said first conduit and having an inlet end and an outlet end, an open ended second pipe of substantially smaller diameter than said first pipe, means mounting said second pipe in said outlet end of said first pipe in concentric relation with said first pipe and with an open end of said second pipe opening into and facing said inlet end of said first pipe, adapter means connected to an end of said first conduit remote from said inlet chamber and positioned to direct stock and reject particles into and tangentially of said first pipe at the inlet end thereof, and means at the outlet end of said first pipe defining a reject outlet for accepting such reject particles while providing for the return flow of stock to said inlet chamber through said second pipe and said second conduit.

12. The improved screening apparatus according to claim 11 further comprising a chamber located below said first pipe and having a cylindrical outer wall and upper and lower ends, means connecting said upper end of said chamber with said outlet from said first pipe to conduct reject particles from said first pipe into said chamber, said connecting means including a tube depending into the upper portion of said chamber from said upper end thereof and cooperating with said chamber outer wall to define an annular space within and adjacent the upper end of said chamber, and means for supplying liquid directly to said annular space through said cylindrical wall to carry fiber from said reject chamber back through said first pipe to said second pipe.

* * * * *